(12) United States Patent
Lynch et al.

(10) Patent No.: US 8,127,138 B1
(45) Date of Patent: Feb. 28, 2012

(54) METHOD FOR EMBEDDING INFORMATION IN SONAR

(75) Inventors: Robert S. Lynch, Old Mystic, CT (US); G. Clifford Carter, Waterford, CT (US); Bijan Mobasseri, Phoenixville, PA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 625 days.

(21) Appl. No.: 12/287,156

(22) Filed: Sep. 29, 2008

(51) Int. Cl.
*H04L 9/32* (2006.01)
*H04L 9/00* (2006.01)
*G01S 15/00* (2006.01)
*G01S 3/80* (2006.01)
*G01R 25/00* (2006.01)
*G01R 23/00* (2006.01)
*G01R 23/16* (2006.01)
*G01R 13/00* (2006.01)

(52) U.S. Cl. .......... 713/176; 380/43; 367/100; 367/125; 367/107; 702/79; 702/75; 702/77; 702/66

(58) Field of Classification Search ................. 367/100, 367/125, 107; 380/43; 702/79, 75, 77, 66; 713/176
See application file for complete search history.

(56) References Cited

PUBLICATIONS

Mobasseri, Bijan;Lynch, Robert; Carter, Clifford, Information Embedding in Sonar for Authentication and Identification, May 20, 2008, IEEE, pp. 1-5.*

* cited by examiner

*Primary Examiner* — Philip Lee
(74) *Attorney, Agent, or Firm* — James M. Kasischke; Jean-Paul A. Nasser; Michael P. Stanley

(57) ABSTRACT

The invention as disclosed is of a method to authenticate identify and trace sonar transmissions and echoes by embedding transparent, secure and robust digital watermarks in signal space, where the additional information incurs no cost in bandwidth. The complex short time Fourier transform is selected as the domain for embedding the digital watermark, secured by a secret key, in the time frequency representation of the signal. The watermark is designed through an iterative optimization step. This step insures that the watermarked sonar is also realizable. Selection of the time frequency region for watermarking is driven by avoidance of interference with the sonar itself, or in case of network operation, other watermarks. In addition, the selected time-frequency region remains robust to sound channel and other transmission effects. Sonar echoes are authenticated in the time-frequency plane by a correlation receiver tuned to the watermarked region using the secret key.

1 Claim, 4 Drawing Sheets

METHOD FOR EMBEDDING INFORMATION IN SONAR

STATEMENT OF GOVERNMENT INTEREST

The invention described herein may be manufactured and used by or for the Government of the United States of America for governmental purposes without the payment of any royalties thereon or therefore.

CROSS TO OTHER PATENT APPLICATIONS

None.

BACKGROUND OF THE INVENTION (1) Field of the Invention

The present invention is directed to sonar systems. In particular, the present invention is directed to a method for embedding information in sonar.

(2) Description of the Prior Art

Undersea acoustic communication, ranging and target detection is made possible by employing active sonar. Sonar waveforms are often characterized by fundamental parameters such as amplitude, frequency and phase. In an undersea acoustic network environment employing multiple nodes, it is not possible to identify the point of origin of a sonar transmission or echo based solely on signal shape. The ability to tie sonar emissions and echoes to their respective sources is a valuable capability for authentication, identification and countermeasures. There is a need to identify sonar echoes based on their points of origin, mission, and platform, to authenticate friendly returns, to institute countermeasures and to perform covert communications. Prior art methods of identifying sonar echoes include traditional watermarking models, but often impinge upon bandwidth and are not effective in a noisy underwater environment. What is needed is a method to authenticate identify and trace sonar transmissions and echoes by embedding transparent, secure and robust digital watermarks in signal space, where the additional information incurs no cost in bandwidth.

SUMMARY OF THE INVENTION

It is a general purpose and object of the present invention to create a method and apparatus for embedding information in sonar.

It is a further purpose and object of the present invention to embed information in sonar without taking up additional bandwidth in acoustic channels.

It is a further purpose and object of the present invention to embed information in sonar without interfering with the sonar signature.

The above object is accomplished with the present invention through the use of a method that embeds a digital watermark, secured by a secret key, in the time frequency representation of the signal. A subset of the time-frequency plane is selected for watermarking. The watermark is designed through an iterative optimization step. This step insures that the watermarked sonar is also realizable. Selection of time frequency region for watermarking is driven by avoidance of interference with the sonar itself, or in case of network operation, other watermarks. In addition, the selected time-frequency region remains robust to sound channel and other transmission effects. Sonar echoes are authenticated in the time-frequency plane by a correlation receiver tuned to the watermarked region using the secret key.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION OF THE INVENTION

Figure 1:
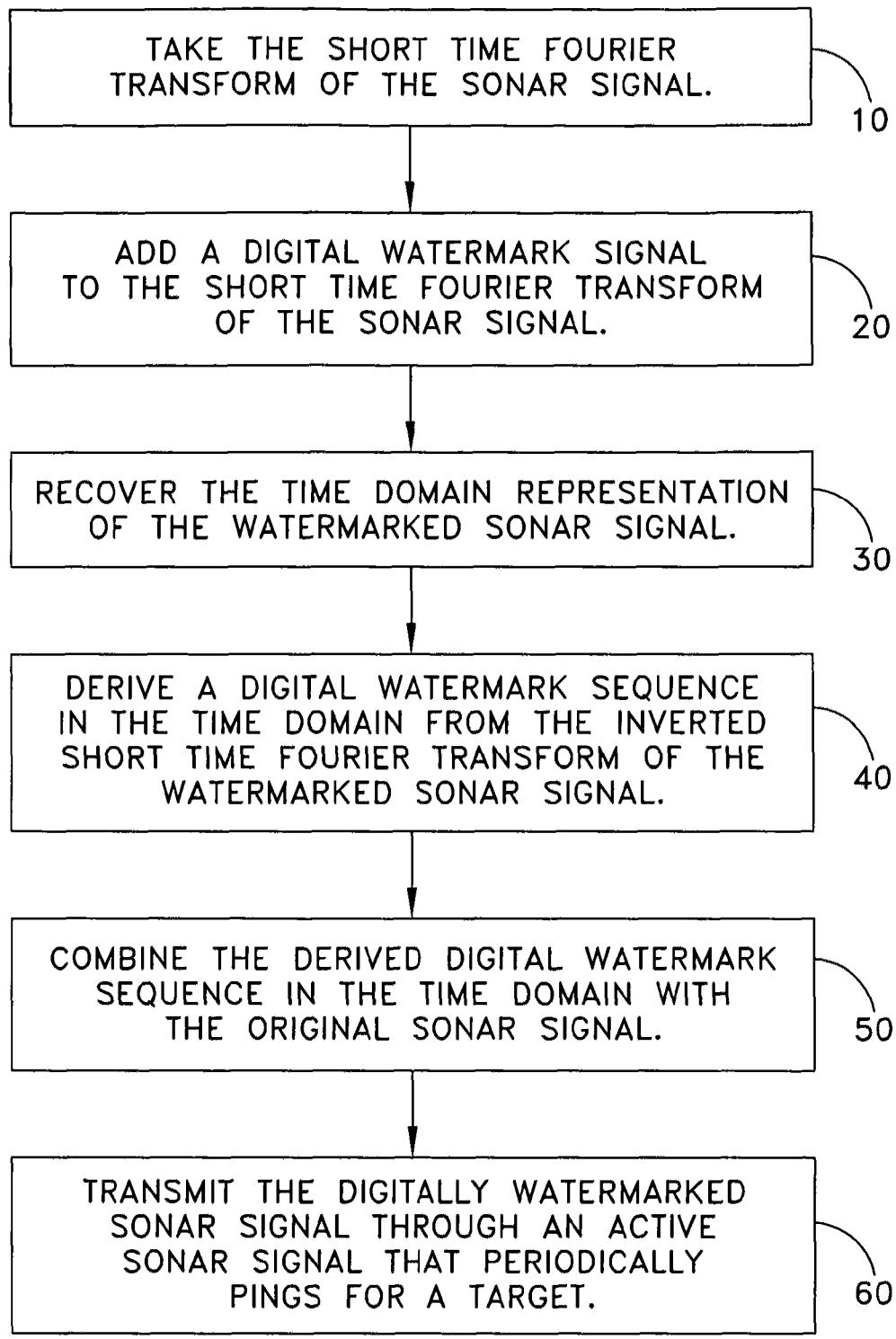
FIG. 1 is a flow diagram of the method of the watermark embedding of the present invention.

The present invention is based upon providing a unique identifier to digital media to distinguish it from other digital media. Used in the context of sonar, the unique identifier is a digital watermark. An acoustic emitter can be designed to uniquely characterize an acoustic signal with an embedded digital watermark. Such a digital watermark is application dependent and may contain numerous pieces of information such as platform, location, physical characteristics and mission. The digital watermark of the present invention resides in imperceptible portions of signal space so that no additional payload is created. Specifically, the watermark is embedded in the short-time Fourier transform of the sonar. The goal is a transparent and robust embedding of information under the cover of another signal. Once either a sonar signal or echo is received, the watermark is then extracted from the sonar echo characterized by a delay, Doppler shift, random amplitude fluctuations, and additive Gaussian noise.

Digital watermarking consists of at least 7 elements, 1) a cover signal Y, 2) a feature vector $f$, 3) the watermark or message bits b, 4) an embedding key k, 5) a watermark encryption key (optional), 6) an embedding function E, 7) a quality metric Q and 8) the watermarked signal $Y_w$. The feature vector, $f$, may come from spectral, spatial or any other attribute of Y that can be modified to carry the watermark. The embedding function along with the quality metric decides which features can be modified. The departure of $Y_w$ from Y is measured by Q. The watermark sequence is a data vector that carries information needed to uniquely identify Y. This sequence may itself be a secret message. The distinction between watermarking and data hiding is often the size of the payload. A watermark, by virtue of being an identification tag, is of a small payload. In data hiding applications, the cover is often immaterial. In watermarking the cover is what needs to be protected or authenticated. For additional security, the watermark itself may be optionally encrypted before embedding. In summary, the elements of digital watermarking are expressed as follows:

$$Y \Rightarrow f = (f_1, f_2, \ldots f_m) \quad (1)$$
$$b = (b_1, b_2, \ldots, b_n)$$
$$Y_W = E(f)$$
$$= (f_1, \ldots f_i + b_1, \ldots, f_j + b_2, \ldots f_k + b_n, \ldots, f_m)$$
$$\|Y - Y_W\| < Q$$

where $\| \; \|$ is the norm of the difference operator.

Waveforms used for active sonar take on a variety of shapes. In the present invention, a logarithmic chirp waveform is used as the model for the sonar signal. However, the present invention is not dependent on the model. In the present invention, the acoustic channel model proposed in *Waveform Fusion in Sonar Signal Processing*, in *IEEE Transactions on Aerospace and Electronic Systems*, 40, 2 (2004), (pp. 462-477) is used with a different sound propagation model. The received signal consists of three components, 1) a delayed and Doppler shifted version of the transmitted signal, 2) additive Gaussian noise, and 3) seabed clutter.

The process of watermarking a sonar signal is illustrated in the flow diagram of FIG. 1. Watermarking of sonar requires identification of a feature space where the watermark can be securely and robustly embedded. Although spread spectrum watermarking is an effective watermarking method, a swept frequency sonar is a non-stationary signal best characterized by its time-frequency representation. Therefore, the present invention embeds the watermark in the time-frequency representation of the sonar signal. Selected time-frequency coefficients of the signal are altered by additively modifying them using the desired watermark sequence. The modified time-frequency distribution is then inverted to generate the watermarked sonar. Watermarking in the time-frequency domain is similar to time-frequency filtering or signal expansion. The desired filter passes the signal within the given time-frequency region R and rejects anything outside of this region. The filter can then be used to design a watermark with a given time-frequency support. The first step of the present method is to obtain the Short-Time Fourier Transform 10 as illustrated in FIG. 1.

In the present invention, watermarking sonar requires modifying the sonar signal's Short Time Fourier Transform (STFT). Modification of the STFT coefficients is conceptually similar to spread spectrum watermarking where discrete cosine transform DCT coefficients are additively modified by the watermark sequence. Let s(n) be the signal defined over n∈{-∞,∞}. Its STFT is given by the discrete Fourier transform DFT of s(n) weighted by a finite window w(n), according to the following equation:

$$S(n, \omega_k, h) = \sum_{m=-\infty}^{m=\infty} w(nh - m)s(m)e^{-j\omega_k m} \quad (2)$$

$$\omega_k = \frac{2\pi k}{L}, k = 0, 1, \ldots, \frac{L}{2}$$

where h is the hop parameter specifying the overlap of sliding windows with $h_{min}=1$ and $h_{max}=N$ points. The window is of duration N samples and is shaped to weight x(n). STFT can be interpreted as a filter bank operation where s(n) is first downshifted to frequency $\omega_k$ then low pass filtered by w(n). Another interpretation of STFT is the Fourier transform of a modified sequence given by s(m)w(nh−m). With no loss of generality h=1 and can be dropped from the notation. It is of interest that STFT is a fully invertible transformation.

The second step of the present method is to define the watermarked STFT of the sonar signal, step 20 as illustrated in FIG. 1. The watermarked STFT of the sonar is defined as:

$$S_W(n, \omega_k) = S(n, \omega_k) + \alpha(n, \omega_k)W(n, \omega_k)I(n, \omega_k) \quad (3)$$

$$I(n, \omega_k) = \begin{cases} 1, (n, \omega_k) \in R \\ 0, (n, \omega_k) \notin R \end{cases}$$

where $\alpha(n,\omega_k)$ controls the watermark strength, $W(n,\omega_k)$ is the watermark sequence and $I(n,\omega_k)$ is the indicator function designed to contain the watermark's time-frequency support to R. $W(n,\omega_k)$ is a pseudo random sequence of desired length and is created by a secret key. This key is used at the decoder to create the reference watermark. Robustness and transparency are the two most important requirements in watermarking. Any impairment in an acoustic channel such as power loss, sea noise, multi-path, fading and reverberation all contribute to make the watermark undetectable. Robustness is enhanced by increasing a watermark's strength. However, this works against transparency by making the watermark more "visible". Watermarking necessarily alters the sonar but the change must be difficult to detect. A transparent watermark should preferably cause changes in the sonar that naturally occur in the acoustic channel. If locked and subsequently unlocked with a security key, then the watermark can be detected by the intended receiver but appear as noise or an irrelevant signal to all others. Transparency is controlled by a combination of watermark strength, watermark sequence, and the choice of the time-frequency plane R where the watermark is embedded.

The third step of the present method is to recover the time-domain representation of the watermarked sonar signal 30 as illustrated in FIG. 1. In order to recover the time-domain representation of the watermarked sonar, the STFT is inverted. Although an unmodified STFT has an exact inverse, there is no guarantee that a modified STFT remains a valid transform; there may not be a real signal with the same STFT as the modified one. The reason is that the sliding window in equation (2) creates correlation among STFT samples. Arbitrary modification of these STFT samples breaks the correlation making an exact inverse unlikely. The inversion of a modified STFT is an optimization problem in that a signal is sought whose STFT is close, in some sense, to the target STFT. Inversion is accomplished through an ad hoc approach that uses the overlap-and-add method to estimate the desired signal. This approach iteratively updates the estimated signal, computes its STFT and compares it with the target STFT to guide the update. In the present invention, $S_W(n,\omega_k)$ is the STFT of the watermarked sonar. The objective is to find a sequence whose STFT is optimally close to $S_W(n,\omega_k)$. Inversion of $S_W(n,\omega_k)$ is the sum of two inversions:

$$[S_W(n, \omega_k)]^{-1} = [S(n, \omega_k)]^{-1} + \alpha[W(n, \omega_k)]^{-1} \quad (4)$$

$$= s(n) + \alpha[W(n, \omega_k)I(n, \omega_k)]^{-1}$$

The first term on the right hand side is the original sonar signal. The second term is the target STFT given by $Y(n,\omega_k)=[W(n,\omega_k)I(n,\omega_k)]^{-1}$.

The fourth step of the method is to derive a digital watermark sequence in the time domain from the inverted short time Fourier transform of the watermarked sonar signal 40 as illustrated in FIG. 1. The objective is to estimate a sequence x(n) whose STFT is optimally close to $Y(n,\omega_k)$. It is the second inversion in equation (4) that is being sought. The following iterative procedure is used to accomplish the inversion:

$$x^{i+1}(n) = \frac{\sum_m \sum_k w(n-m)\hat{x}^i(n, \omega_k)e^{j\omega_k n}}{\sum_m w^2(m-n)} \quad (5)$$

where $$\hat{x}^i(n, \omega_k) = |Y(n, \omega_k)|\frac{X^i(n, \omega_k)}{|X^i(n, \omega_k)|}$$

In step i, the STFT of $x^i(n)$, $x^i(m,\omega_k)$, is computed and its magnitude is replaced by the magnitude of the target STFT, producing $\hat{x}^i(m,\omega_k)$. This step is shown in the second part of equation (4). From the modified STFT, $x^{i+1}(n)$ is generated and the process repeats. At the completion of this process x(n) is the desired watermark sequence whose time-frequency support is almost within R.

The fifth step of the method is to combine the derived digital watermark sequence in the time domain with the original sonar signal resulting in a digitally watermarked sonar signal 50 as illustrated in FIG. 1. The complete watermark sonar signal is then given by the addition of the generated estimated watermark sequence and the original sonar expressed as follows:

$$s_w(n)=s(n)+x(n) \qquad (6)$$

The sixth step of the method is to transmit the digitally watermarked sonar signal through an active sonar signal that periodically pings for a target 60 as illustrated in FIG. 1.

Figure 2:
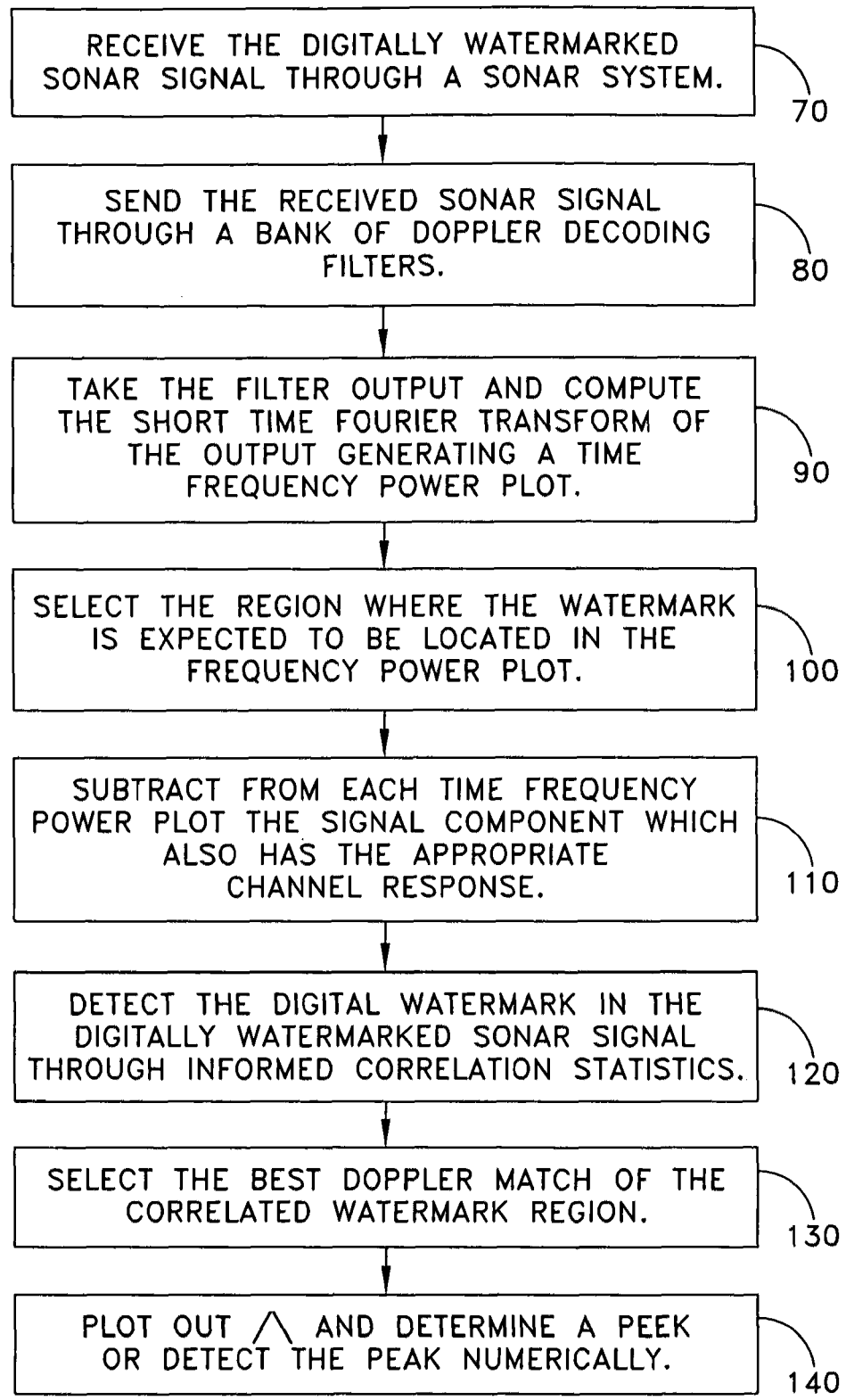
FIG. 2 is a flow diagram of the method of the watermark recovery of the present invention.

The method of the watermark embedding of the present invention is the first half of the overall method of the present invention. For the present invention to be of any practical use there is needed a method to recover the watermark from a sonar signal. This represents the second half of the present invention as illustrated in the flow diagram of FIG. 2. The first step in the method of recovering the watermark from a sonar signal is to receive the digitally watermarked sonar signal through a sonar system 70. However, this involves first modeling the detection of the actual sonar signal. Active sonar pings potential targets every T seconds. The returned pulse is modeled by the following equation:

$$r(t)=As_w(t-t_d)e^{j2\pi f_d t}+n(t)+c(t) \qquad (7)$$

The watermarked sonar is designated by $s_w(t)$. The amplitude A is modeled after a slowly varying Swerling I target from ping to ping but remains constant during a ping. Other variables are $t_d$, the round trip delay, $f_d$, the Doppler shift, where n(t) is additive Gaussian noise and c(t) is the returned clutter from the seabed. If the transmitter is located at the sound speed minimum depth, sound traveling upward is bent down towards the sound channel. Sound that is projected down is bent up toward the sound channel. When the receiver is also located on the sound channel axis, there is a dominant straight path from the source to the receiver as well as paths cycling above and below the axis. This phenomenon has led some researchers to argue that the sound channel may be characterized by Rician fading. Absorption by the seabed is modeled by a low pass filter with impulse response h(t). Returns from the seabed are then characterized by $c(t)=s_w(t)*b(t)$. A first order Butterworth filter models b(t). Expanding the clutter term results in the following expression:

$$c(t)=s(t)*b(t)+x(t)*b(t) \qquad (8)$$

Therefore, traces of the watermark also appear in the clutter term.

Figure 3:
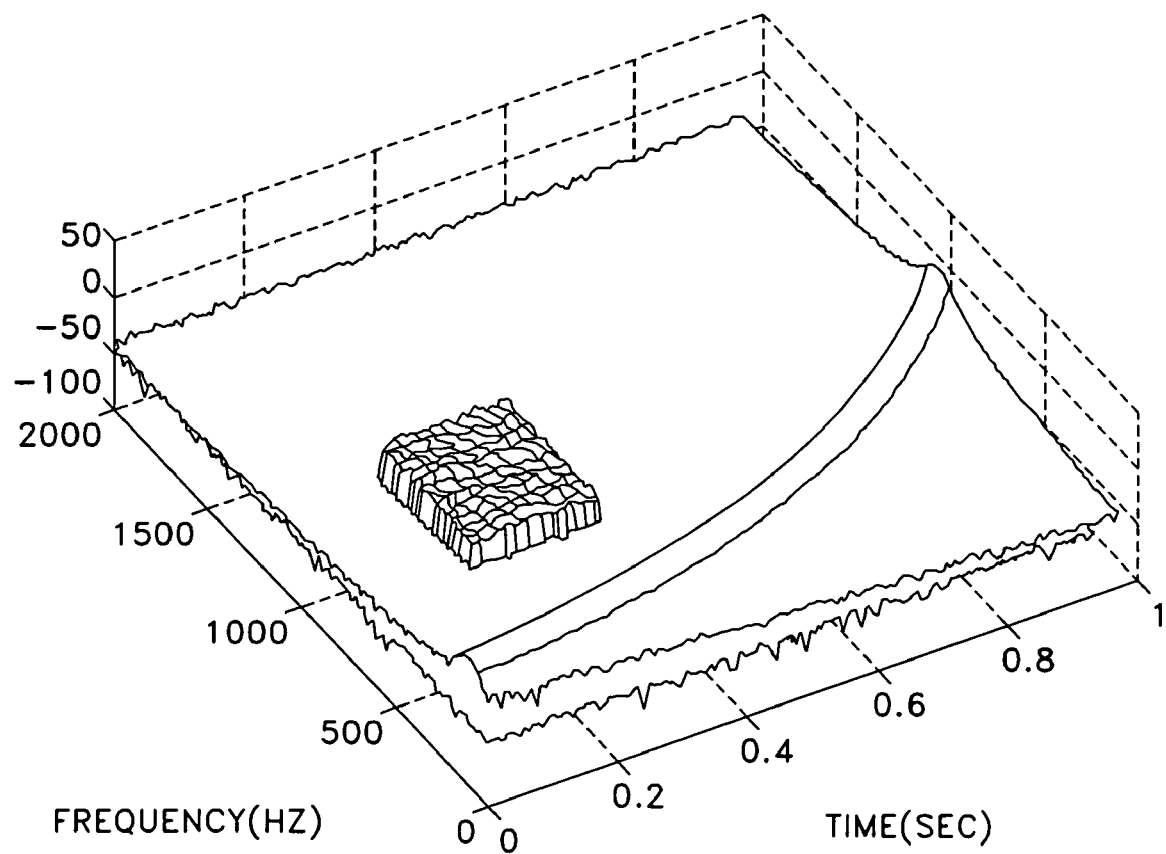
FIG. 3 is a plot of the region where the watermark is expected to be located in the time frequency power plot.
Figure 4:
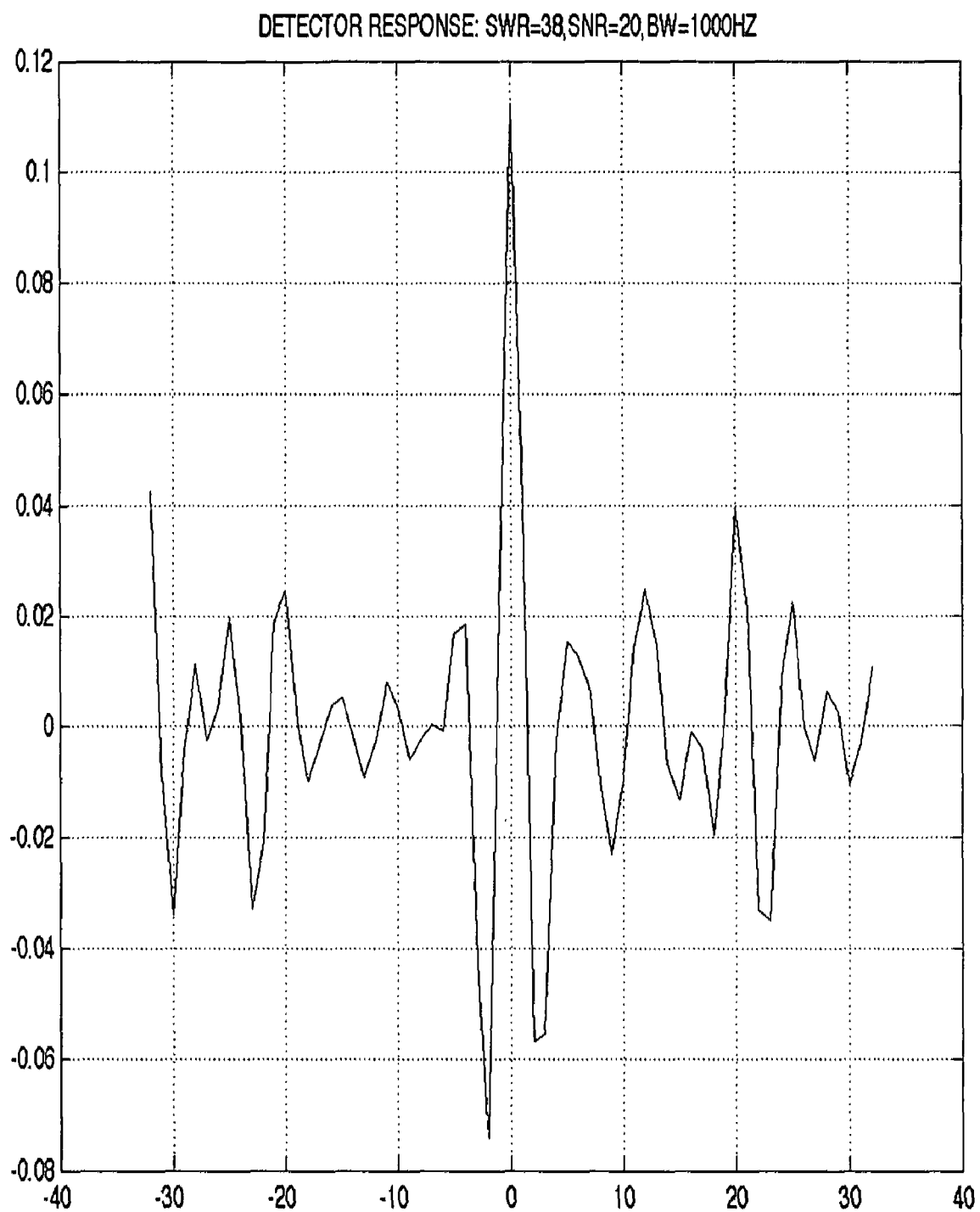
FIG. 4 is a detector response plot of $\Lambda$ showing a peak.

Detection of the watermark and detection of sonar returns are two different functionalities. Detection of a sonar echo is intended to establish the presence of a target, its location, and bearing. The next step in the method to detect or recover the water mark is to process the received sonar signal through a bank of matched Doppler decoding filters tuned to expected Doppler shifts 80. The sampled output of the filters is then used in a hypothesis testing stage where the presence or absence of a target is established. This stage comprises the nest step of the method 90, which is to compute the short time Fourier transform of the output thereby generating a time frequency power plot. The next step, 100 is to select the region where the watermark is expected to be located in the time frequency power plot. The plot and area are illustrated in FIG. 3. The next step, 110 is to subtract from each time frequency power plot the signal component which also has the appropriate channel response, leaving just the watermark and the channel noise in that region of the time frequency power plot.

The watermark detector enters into the picture after the sonar is already detected. The implication being that delay and Doppler estimations are dealt with before sonar is handed off to watermark the detection stage. The watermark detector is implemented as an informed correlation detector. The next step, 120 is to detect the digital watermark in the specific region of the time frequency power plot through informed correlation statistics. All available information is used to enhance detection of the watermark. An informed watermark detector knows the watermark, secret key, and functional form of the sonar. Watermark detection is further improved by recognizing that both the sonar and the watermark go through the same channel. Therefore, the local copy of the watermark used for correlation is not the original watermark but the estimate of it after propagation through the channel. To the extent that the channel can be correctly modeled, watermark detection performance is enhanced. The output of the correlation detector is designated as Λ. Following delay and Doppler compensation Λ is expressed as follows:

$$\Lambda=A<s(t),b(t)*x(t)>+<Ax(t),b(t)*x(t)>+<n(t),b(t)* x(t)>+<b(t)*x(t),b(t)*x(t)> \qquad (9)$$

where $<\ >$ is the inner product symbol. The dominant term is the last term, which is the self correlation of the filtered watermark. The second term is the correlation of the watermark with the filtered watermark weighted by random amplitude A. The first and third terms are basically noise terms. The next step, 130 is to determine the best Doppler match of the correlated watermark region. The final step 140 of the method comprises plotting Λ and detecting the peak is a confirmation of the existence of the watermark. In the alternative, algorithmic methods that are well known in the art can also be used to detect the peaks numerically.

The advantage of the present invention is that the embedded digital watermark remains detectable after passage through an acoustic channel. By embedding the digital watermark in the time-frequency domain, the watermark is able to endure the degrading effects of the acoustic channel. In addition, implementing a detector as an informed detector makes it more robust, thereby allowing for reliable watermark detection in the presence of random noise, seabed clutter and slow fading.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for embedding and detecting a digital watermark in the time-frequency plane of an active sonar signal comprising the steps of:

taking a short time Fourier transform of the active sonar signal according to the following equation $$S(n, \omega_k, h) = \sum_{m=-\infty}^{m=\infty} w(nh-m)s(m)e^{-j\omega_k m}$$

$$\omega_k = \frac{2\pi k}{L}, k = 0, 1, \ldots, \frac{L}{2};$$

adding a digital watermark signal to the short time Fourier transform of the active sonar signal wherein the digital watermark signal is generated from a pseudo random sequence by a secret key, $\alpha(n,\omega_k)$, according to the following equation $$S_W(n, \omega_k) = S(n, \omega_k) + \alpha(n, \omega_k)W(n, \omega_k)I(n, \omega_k)$$

$$I(n, \omega_k) = \begin{cases} 1, (n, \omega_k) \in R \\ 0, (n, \omega_k) \notin R \end{cases};$$

recovering a time domain representation of the active sonar signal after the digital watermark has been added to the sonar signal by inverting the short time Fourier transform of the active sonar signal after the digital watermark has been added according to the following equation $$[S_W(n, \omega_k)]^{-1} = [S(n, \omega_k)]^{-1} + \alpha[W(n, \omega_k)]^{-1}$$
$$= s(n) + \alpha[W(n, \omega_k)I(n, \omega_k)]^{-1};$$

deriving a digital watermark sequence in a time domain from the inverted short time Fourier transform of the active sonar signal after the digital watermark has been added according to the following equation $$x^{i+1}(n) = \frac{\sum_m \sum_k w(n-m)\hat{X}^i(n, \omega_k)e^{j\omega_k n}}{\sum_m w^2(m-n)}$$

where $$\hat{X}^i(n, \omega_k) = |Y(n, \omega_k)|\frac{X^i(n, \omega_k)}{|X^i(n, \omega_k)|};$$

combining the derived digital watermark sequence in the time domain with an original sonar signal resulting in a digitally watermarked sonar signal according to the following equation $s_w(n)=s(n)+x(n);$ transmitting the digitally watermarked sonar signal through a second active sonar signal that periodically pings for a target;

receiving the digitally watermarked sonar signal through a sonar system;

processing the received digitally watermarked sonar signal through a plurality of Doppler decoding filters;

computing the short time Fourier transform of the output of the plurality of Doppler decoding filters and generating a time frequency power plot;

selecting a region where the watermark is expected to be located in said time frequency power plot;

subtracting from said time frequency power plot a signal component which also has an appropriate channel response;

detecting the digital watermark in the digitally watermarked sonar signal through informed correlation statistics that include knowledge of the digital watermark, the secret key, a functional form of a sonar and an estimate of the digital watermark after said digital watermark has propagated through a sound channel with assumed channel clutter characteristics according to the following equation $\Lambda=A<s(t),b(t)*x(t)>+<Ax(t),b(t)*x(t)>+<n(t),b(t)*x(t)>+<b(t)*x(t),b(t)*x(t)>;$ selecting a Doppler match of correlated watermark region; and plotting $\Lambda$ to determine a peak, thereby confirming an existence of the digital watermark.

\* \* \* \* \*